(12) United States Patent
Une

(10) Patent No.: US 7,492,478 B2
(45) Date of Patent: Feb. 17, 2009

(54) IMAGE PROCESSING DEVICE AND METHOD

(75) Inventor: Kiyoshi Une, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1040 days.

(21) Appl. No.: 10/871,042

(22) Filed: Jun. 21, 2004

(65) Prior Publication Data

US 2004/0264772 A1  Dec. 30, 2004

(30) Foreign Application Priority Data

Jun. 26, 2003  (JP) ............... 2003-182666

(51) Int. Cl.
*G06F 15/00* (2006.01)

(52) U.S. Cl. .................. 358/1.9; 358/501; 358/518; 358/521; 382/162; 382/167

(58) Field of Classification Search .................. 358/1.9, 358/501, 518, 521; 382/162, 167
See application file for complete search history.

(56) References Cited

U.S. PATENT DOCUMENTS

| 5,521,723 | A | * | 5/1996 | Madden et al. ............. 358/501 |
| 6,172,681 | B1 | | 1/2001 | Ueda |
| 6,665,434 | B1 | * | 12/2003 | Yamaguchi ................. 382/162 |
| 2002/0000993 | A1 | | 1/2002 | Deishi et al. |
| 2002/0031256 | A1 | | 3/2002 | Hiramatsu et al. |
| 2003/0053689 | A1 | * | 3/2003 | Watanabe et al. ........... 382/167 |
| 2003/0174886 | A1 | * | 9/2003 | Iguchi et al. ............... 382/167 |

FOREIGN PATENT DOCUMENTS

| EP | 1 160 691 A2 | 12/2001 |
| JP | A 5-336366 | 12/1993 |
| JP | A 7-170417 | 7/1995 |
| JP | A-2001-320594 | 11/2001 |
| JP | A-2002-016875 | 1/2002 |
| JP | A-2002-354276 | 12/2002 |

\* cited by examiner

*Primary Examiner*—Michael Burleson
(74) *Attorney, Agent, or Firm*—Oliff & Berridge, PLC

(57) ABSTRACT

An image processing device including a storage unit which stores, for set moving-target-positions of a lightness or gray axis on an uniform color space in color balance correction, color correction parameters for performing color balance correction corresponding to moving the lightness or gray axis substantially parallel to a specific moving-target-position on the uniform color space to inputted color image data, and a correction unit which, when color balance correction to the target color image data is instructed via an instruction unit, reads a color correction parameter corresponding to the instructed color balance correction among the color correction parameters stored in the storage unit, to perform color balance correction to the target color image data using the read color correction parameter, is provided.

19 Claims, 7 Drawing Sheets

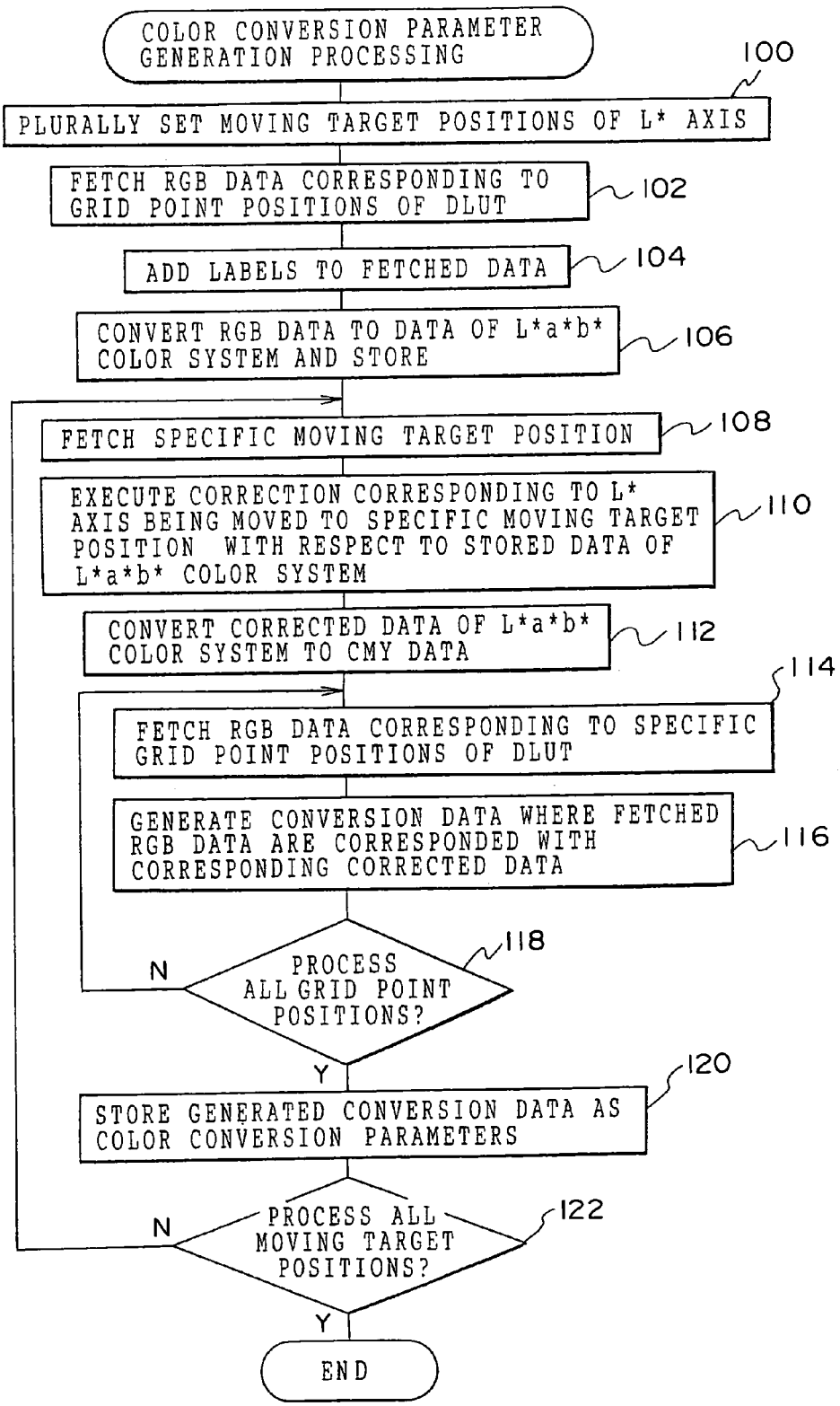

COLOR SPACE OF L*a*b* COLOR SYSTEM

DISTRIBUTION OF IMAGE DATA ON L*a*b* COLOR SPACE

EXAMPLE OF MOVING TARGET POSITIONS

MOVING TARGET POSITION OF L* AXIS

EXAMPLE OF COLOR CONVERSION PARAMETERS SET ON THE BASIS OF MOVING TARGET POSITIONS

COLOR CONVERSION PARAMETERS (DISTRIBUTION AFTER CONVERSION)

ANOTHER EXAMPLE OF MOVING TARGET POSITIONS

MOVING TARGET POSITION OF L* AXIS

ANOTHER EXAMPLE OF MOVING TARGET POSITIONS

POSITION CORRESPONDING TO WHITE OF RECORDING PAPER

FIG. 7A: EXAMPLE OF COLOR BALANCE CORRECTION USER INTERFACE
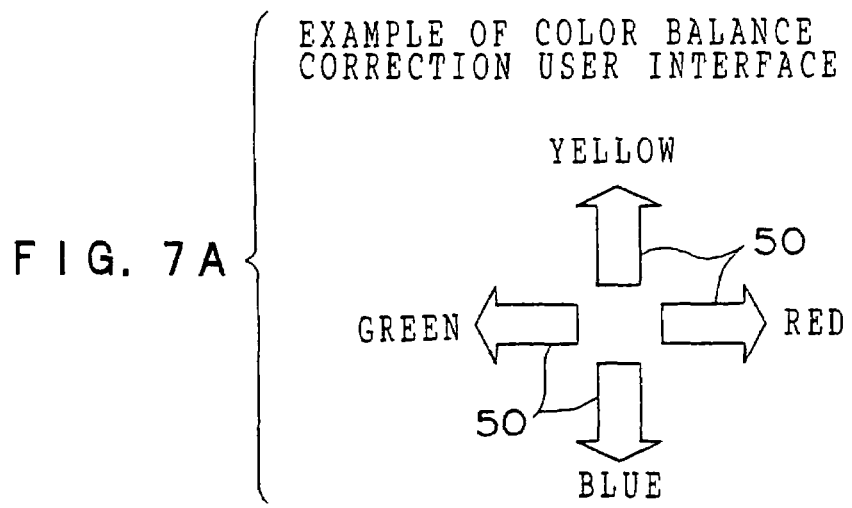
FIG. 7B: ANOTHER EXAMPLE OF COLOR BALANCE CORRECTION USER INTERFACE
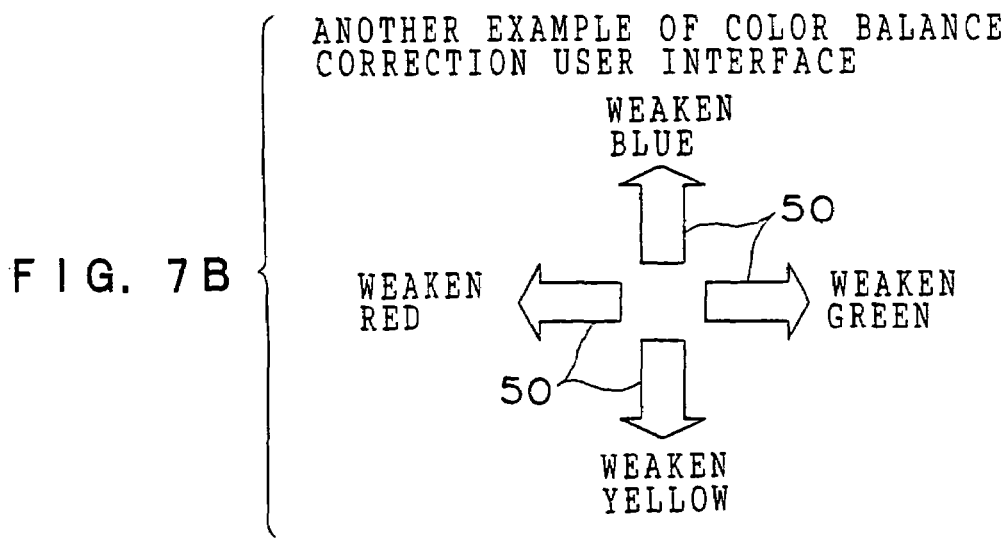
FIG. 7C
EXAMPLE OF COLOR BALANCE CORRECTION (SKIN COLOR ADJUSTMENT) USER INTERFACE
| SKIN COLOR (REDDISH) |
| SKIN COLOR (BLUISH) |
| SKIN COLOR (YELLOWISH) |

IMAGE PROCESSING DEVICE AND METHOD

CROSS-REFERENCE TO RELATED APPLICATION

This application claims priority under 35 USC 119 from Japanese Patent Application No. 2003-182666 the disclosures of which are incorporated by reference herein.

BACKGROUND OF THE INVENTION

1. Field of the Invention

The present invention relates to an image processing device and method, and in particular to an image processing device and an image processing method that conduct color balance correction with respect to a color image.

2. Description of the Related Art

Among printers that form a color image, subtle differences arise in color tint (gray balance, etc.) of the image due to differences in the machines and variations in environmental conditions, even if the printers are of the same model. The following technologies are known as technologies that correct individual differences in color tint.

(1) Correction Based on Colorimetric Processing

A test chart is created in which numerous patches whose densities or colors are mutually different are disposed, the individual patches of the created test chart are measured with a colorimeter mounted on the printer or are read by a scanner or the like, and parameter for controlling image quality (color tint) is corrected in accordance with the colorimetric values of the individual patches.

(2) Correction Based on Comparison with Color Sample

Color sample for patches is prepared in advance, a user compares the individual patches on the test chart created by the printer with the color sample, the user selects, from among the individual patches on the test chart, the patch thought to be the closest to the sample, and then correction of the parameter is conducted on the basis of the result of the patch selection by the user.

(3) Correction by Appropriately Selecting Plural Types of Parameters Prepared in Advance Plural types of parameters corresponding to mutually different conditions are prepared in advance, and correction is conducted by selectively using parameters corresponding to condition at the time of image formation. For instance, technology where color conversion parameters are prepared for each environmental condition and the color conversion parameters are switched in accordance with the environmental condition detected by an environment, and technology where plural gamma coefficients are learned in advance by a neural net and the gamma coefficients are switched in accordance with toner characteristics, are known.

However, although the correction of (1) can correct with high precision individual differences of printers, there is the problem that the cost increases because it is necessary to either dispose a colorimeter in the printer or prepare a separate scanner. Also, because the work of comparing the patches with the sample, which requires skill, is left to the user, there are drawbacks in that an enormous burden is placed on the user and correction precision is largely dependent on the skill level of the user in regard to the work of the comparison. There is also the problem that correction precision drops in accompaniment with changes in the sample over time.

With respect to the correction of (3), for example, in a case where the color conversion parameters are switched in accordance with environmental condition, it is necessary to prepare an environmental chamber for exposing the printer to various types of environmental conditions in order to obtain color conversion parameters corresponding to various types of environmental conditions, and there is the problem that this costs much and is troublesome. Also, in a case where plural gamma coefficients are learned in advance by a neural net and the gamma coefficients are switched in accordance with toner characteristics, control for switching the parameters becomes extremely complex.

SUMMARY OF THE INVENTION

The present invention has been made in consideration of the above-described facts and provides an image processing device and an image processing method with which it is possible to conduct color balance correction easily and with high precision, without placing a burden on the user or increasing costs.

An image processing device that is a first aspect of the invention includes: a storage unit which stores, for a plurality of set moving target positions of a lightness axis or a gray axis on an uniform color space in color balance correction, color correction parameters for performing color balance correction corresponding to moving the lightness axis or the gray axis substantially parallel to a specific moving target position on the uniform color space with respect to inputted color image data; and a correction unit which, when color balance correction with respect to the color image data to be processed is instructed via an instruction unit, reads a color correction parameter corresponding to the instructed color balance correction among the plurality of the color correction parameters stored in the storage unit, to perform color balance correction with respect to the color image data to be processed using the read color correction parameter.

As the uniform color space pertaining to the first aspect of the invention, the color space of an L*a*b* color system that the CIE (Commission Internationale de l'Eclairage) recommends as a uniform perception color space can be applied, but another color space (e.g., color space of an L*u*v* color system) may be used. The uniform color space is set so that differences (color differences) of colors perceived between two perceived colors become uniform (so that the distances between coordinate positions in the color space of two perceived colors whose color differences are identical are constant). Thus, when color balance correction corresponding to the lightness axis or the gray axis being moved substantially parallel towards the specific moving target position on the uniform color space is conducted with respect to color image data, the overall color balance can be changed to a color balance corresponding to the specific moving target position without causing a partial change in color tint of the image that the color image data represents.

On the basis of this, in the first aspect of the invention, for the plurality of the set moving target positions of the lightness axis or the gray axis on the uniform color space, the color correction parameters for performing color balance correction corresponding to moving the lightness axis or the gray axis substantially parallel to the specific moving target position on the uniform color space with respect to the color image data. The correction unit, when color balance correction with respect to the color image data to be processed is instructed via the instruction unit, reads the color correction parameter corresponding to the instructed color balance correction among the plurality of the color correction parameters stored in the storage unit, to perform color balance correction with respect to the color image data to be processed using the read color correction parameter.

In this manner, in the first aspect of the invention, the color correction parameter corresponding to the color balance correction instructed via the instruction unit is read from the plural color correction parameters stored in advance in the storage unit, to thereby conduct color balance correction. Thus, it becomes unnecessary to use a test chart when conducting correction of difference in color balance resulting from differences in the machines and variations in environmental conditions. Thus, it is possible to prevent that costs, as a result of providing a colorimeter and/or preparing a separate scanner, increase. It is also possible to prevent that an enormous burden is placed on the user as a result of causing the user to conduct the operation of comparing individual patches on a test chart with color samples. Further, correction precision can be prevented from being controlled by the skill level of the user or temporal changes in color samples.

Also, because the color correction parameter is read from the storage unit and used in color balance correction, processing that calculates the color correction parameter becomes unnecessary and color balance correction can be realized with simple processing. Moreover, as described above, because the plural color correction parameters pertaining to the invention are parameters that change the overall color balance to a color balance each corresponding to respective mutually different moving target positions without causing partial changes in the color tint of the image that the color image data represents, the color balance can be precisely adjusted. Thus, according to the first aspect of the invention, it becomes possible to conduct color balance correction easily and with high precision without placing a burden on the user or increasing costs.

An image processing method that is a second aspect of the invention includes:

setting a plurality of moving target positions of a lightness axis or a gray axis on a uniform color space in color balance correction; storing in a storage unit, for the plurality of set moving target positions of the lightness axis or the gray axis, color correction parameters for performing color balance correction corresponding to moving the lightness axis or the gray axis substantially parallel to a specific moving target position on the uniform color space with respect to inputted color image data; and reading a color correction parameter corresponding to the instructed color balance correction among the plurality of the color correction parameters stored in the storage unit, to perform color balance correction with respect to color image data to be processed using the read color correction parameter when color balance correction with respect to the color image data to be processed is instructed via an instruction unit. Therefore, similar to the first aspect, it becomes possible to conduct color balance correction easily and with high precision without placing a burden on the user or increasing costs.

BRIEF DESCRIPTION OF THE DRAWINGS

An example of a preferred embodiment of the invention will be described in detail below with reference to the following drawings, wherein;

FIG. 3 is a flow chart showing the content of color conversion parameter generation processing;

FIGS. 7A to 7C are schematic diagrams showing an example of a user interface in color balance correction.

DETAILED DESCRIPTION OF THE INVENTION

Figure 1:
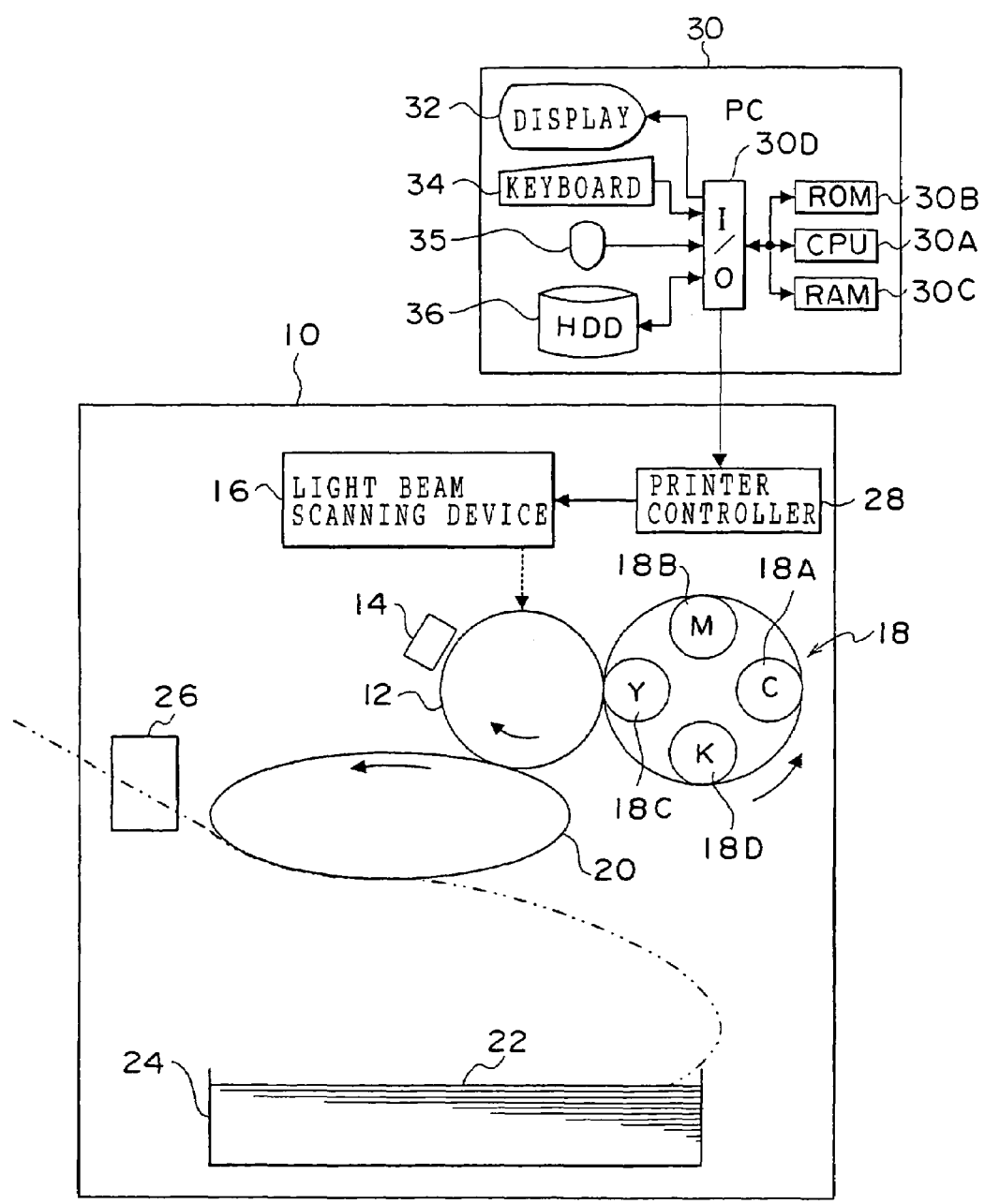
FIG. 1 is a schematic structural diagram of a color printer pertaining to an embodiment of the present invention.

FIG. 1 shows a color printer 10 pertaining to the present embodiment and a computer (PC) 30 that is connected to the color printer 10. Although FIG. 1 shows an example where the number n of color printers 10 is one and the number m of PCs 30 is one, the numbers n and m may be plural (and it goes without saying that n and m do not have to be identical numbers).

The color printer 10 is disposed with a photosensitive drum 12 serving as an image carrier, and the photosensitive drum 12 is charged by a charger (electro static charging device) 14. A light beam scanning device 16 that emits laser beams, which are modulated in accordance with the image to be formed and are deflected along a main scanning direction (direction parallel to the axial line of the photosensitive drum 12), is disposed above the photosensitive drum 12. The laser beams emitted from the light beam scanning device 16 scan a peripheral surface of the photosensitive drum 12 in the main scanning direction, the photosensitive drum 12 is simultaneously rotated and subscanning is effected, whereby electrostatic latent images are formed on the peripheral surface of the photosensitive drum 12.

Also, a multicolor developer unit 18 is disposed at the right side of the photosensitive drum 12 in FIG. 1. The multicolor developer unit 18 is provided with developer units 18A to 18D filled with toners of the respective colors of C (cyan), M (magenta), Y (yellow) and K (black), and develops, with the colors of C, M, Y and K, the electrostatic latent images formed on the photosensitive drum 12. With respect to the formation of a full-color image in the color printer 10, electrostatic latent images are formed in an identical region on the photosensitive drum 12, development of the electrostatic latent images with mutually different colors is repeatedly carried out multiple times, and toner images of the respective colors are successively superposed on the region, whereby a full-color image is formed.

An endless transfer belt 20 is disposed in the vicinity of the photosensitive drum 12, and a paper tray 24 that accommodates recording paper 22 is disposed below the position at which the transfer belt 20 is disposed. The peripheral surface of the transfer belt 20 contacts the peripheral surface of the photosensitive drum 12 further downstream than the position of development by the multicolor developer unit 18 along the rotational direction of the photosensitive drum 12. After the toner images formed on the photosensitive drum 12 have been transferred to the transfer belt 20, they are again transferred to the recording paper 22 that is pulled out from the paper tray 24 and conveyed as far as the position at which the transfer belt 20 is disposed. A fixing unit 26 is disposed on the conveyance path of the recording paper 22 towards the outside of the color printer 10. The toner images that have been transferred to the recording paper 22 are fixed thereto by the fixing unit 26 and the recording paper 22 is discharged to the outside of the color printer 10.

Also, a printer controller 28 is connected to the light beam scanning device 16, and the PC 30 is also connected to the printer controller 28. The printer controller 28 is configured to include a microcomputer and is provided with functions (the details of which will be described later) of controlling the operation of each part of the color printer 10 including the light beam scanning device 16 and carrying out predetermined processing with respect to inputted image data.

The PC 30 is provided with a CPU 30A, a ROM 30B, a RAM 30C and an input/output port 30D, which are all interconnected via a bus. Also, connected to the input/output port 30D are a display 32 serving as a display device, a keyboard 34, a mouse 35 and a hard disk drive (HDD) 36. An OS and various application software programs are stored in the HDD 36. Moreover, programs of a printer driver 38 (see FIG. 2) for setting the color printer 10 and setting conditions of printing conducted by the color printer 10 are also stored in the HDD 36. Printing from the application software operated by the PC 30 is conducted by controlling the color printer 10 via the printer driver 38.

Figure 2:
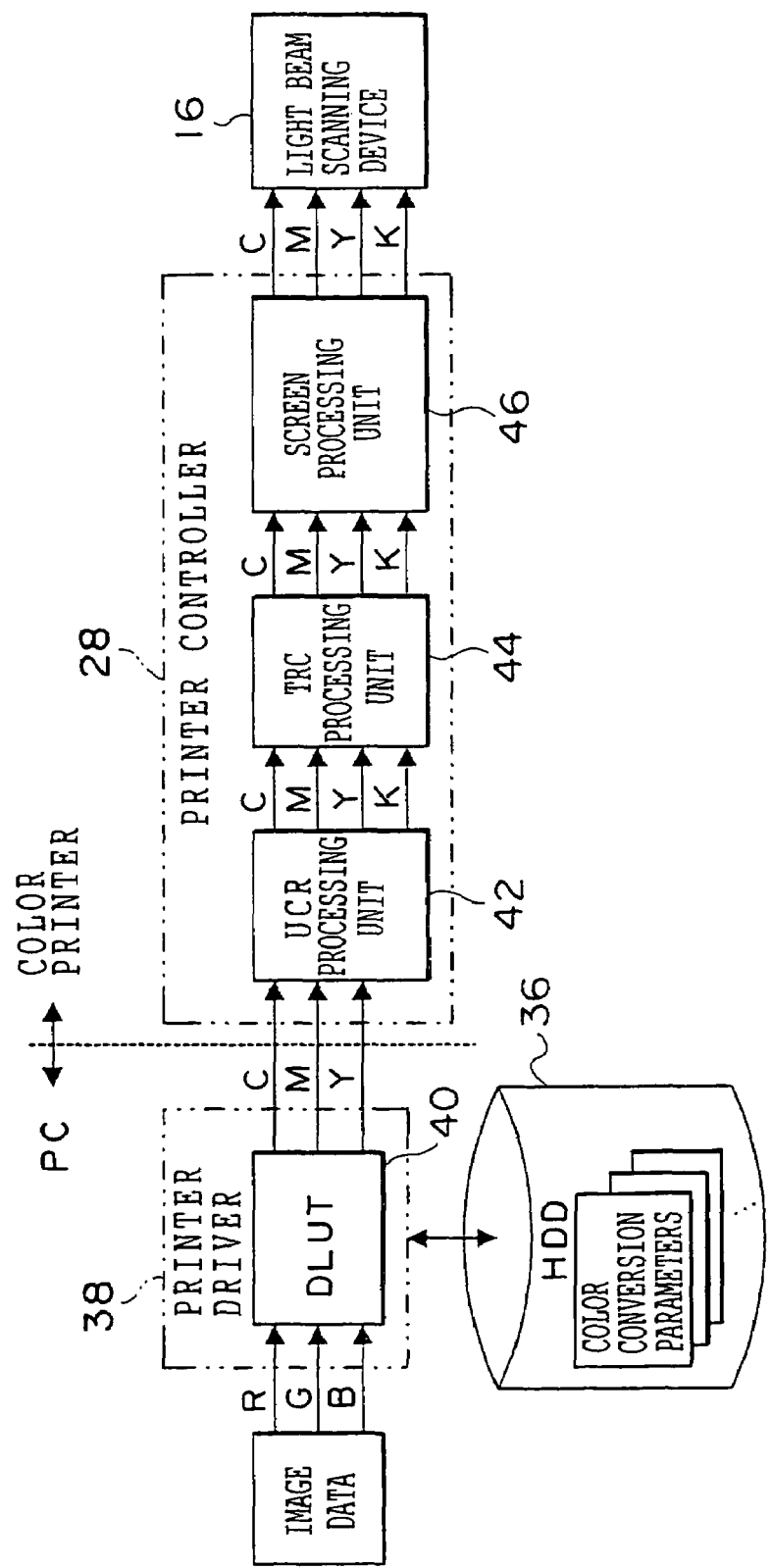
FIG. 2 is a schematic block diagram for describing image processing in a printer driver and a printer controller.

As shown in FIG. 2, the printer driver 38 includes the function of converting inputted R, G and B image data into C, M and Y image data with a multidimensional look-up table (DLUT) 40. The conversion by the DLUT 40 of the printer driver 38 specifically includes a first conversion where the inputted R, G and B image data are converted to data L0, a0 and b0 of a color space of an L*a*b* color system (referred to below simply as L*a*b* color system), a second conversion where the data L0, a0 and b0 that have passed through the first conversion are converted to data L1, a1 and b1 where the lightness range matches the lightness range of a color reproduction region (range of color that the color printer 10 can reproduce on the L*a*b* color space) of the color printer 10, and a third conversion where the data L1, a1 and b1 that have passed through the second conversion are converted to C, M and Y image data.

In the present embodiment, respectively different values are designated as the values of C, M and Y (and K), numerous patches are formed/outputted by the color printer 10 (e.g., a color printer 10 having representative characteristics among numerous manufactured color printers 10), and the outputted patches are colorimetry measured to determine the values of L, a and b, whereby the relations between L, a and b and C, M and Y in a case where an image is formed/outputted by the color printer 10 are predetermined, and the conversion conditions in the third conversion are determined on the basis of these predetermined relations.

Also, the printer driver 38 pertaining to the present embodiment also conducts, in addition to the first to third conversions, conversion (fourth conversion; the details of which will be described later) corresponding to color balance correction in accordance with an instruction of color balance correction by the user. Color conversion parameters for carrying out, with the DLUT 40, conversion in which the first to fourth conversions are integrated are plurally stored in advance in the HDD 36. The printer driver 38 reads, from among the plural color conversion parameters stored in the HDD 36, the color conversion parameter corresponding to the instruction of color balance correction from the user and inputs the inputted R, G and B image data to the preset DLUT 40, whereby the printer driver 38 conducts conversion in which the first to fourth conversions are integrated and outputs the C, M and Y image data.

The DLUT 40 of the printer driver 38 corresponds to a first conversion unit described later, the fourth conversion of the first to fourth conversions realized by the DLUT 40 corresponds to color balance correction pertaining to the invention, and the printer driver 38 also includes the function of a correction unit pertaining to the invention.

The C, M and Y image data outputted from the printer driver 38 are inputted to the printer controller 28 of the color printer 10. In the printer controller 28, an image data processing unit that realizes the function of conducting predetermined processing with respect to the inputted image data is configured by a UCR processing unit 42 that conducts UCR (Under Color Removal) processing that converts the inputted C, M and Y image data into C, M, Y and K image data with a one-dimensional LUT (look-up table), a TRC processing unit 44 that conducts TRC (tone reproduction) processing that uses a one-dimensional LUT to correct the tone characteristics of the image data in accordance with the characteristics of the toners of the color printer 10, and a SCREEN processing unit 46 that conducts SCREEN processing that generates a page image for each page.

The C, M, Y and K image data outputted from the SCREEN processing unit 46 are inputted to the light beam scanning device 16, where they are used to modulate the light beams emitted from the light beam scanning device 16. The image data processing unit described above of the printer controller 28 corresponds to a second conversion unit described later. Also, the PC 30 and the (printer controller 28 of the) color printer 10 correspond to the image processing device of the invention.

Next, the operation of the present embodiment will be described first with reference to FIG. 3 in regard to color conversion parameter generation processing. The color conversion parameter generation processing is processing for generating the conversion parameters of the fourth conversion that realizes the color balance correction pertaining to the invention, and is realized by a color conversion parameter generation program being executed by the PC 30 and a computer (which will be conveniently called a "data generation-use computer" below) other than the color printer 10 prior to the shipping of the color printer 10.

Figure 4A:
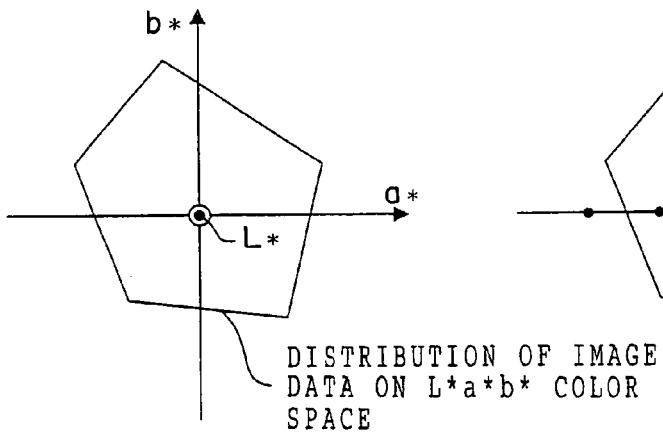
FIG. 4A is a line diagram showing an example of the distribution of image data on a color space of an L*a*b* color system.

The fourth conversion pertaining to the invention is a conversion that corrects color balance by moving the distribution (an example is shown in FIG. 4A) of image data on the L*a*b* color space in a direction perpendicular to the L* axis that is the lightness axis in the L*a*b* color space. In step 100, moving target positions of the L* axis serving as target values that define the correction direction and correction amount of the color balance in the fourth conversion are plurally set. The moving target positions can be set so that the distribution density of the moving target positions in a direction (direction on the L*a*b* color space of color components where fine adjustment is necessary) where fine adjustment of the color balance is necessary becomes higher in the color balance correction with respect to the image formed by the color printer 10.

(Setting of the moving target positions as described above corresponds to setting so that distribution density of the moving target positions in a direction or a region where fine adjustment of color balance is necessary in the uniform color space becomes higher than distribution density of the moving target positions in directions or regions other than the direction or the region.)

Figure 4B:
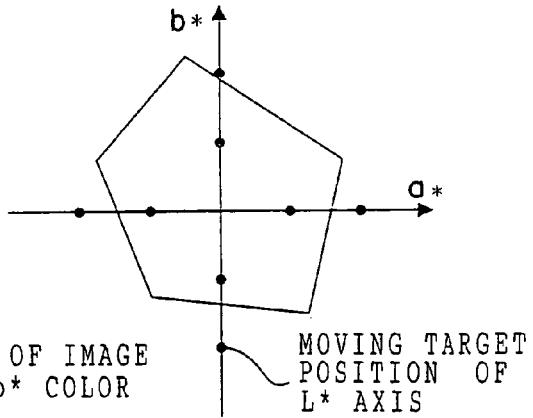
FIG. 4B is a line diagram showing an example of moving target positions of the L* axis.

Specifically, in the color balance correction, because there are many cases where fine adjustments of color balance in the a* axis direction (red-green direction) and the b* axis direction (blue-yellow direction) on the L*a*b* color space become necessary, respective positions when, as shown in FIG. 4B, the position of L* is shifted by specific amounts along the a* axis and the b* axis can be set as the moving target positions. Also, according to the knowledge of the present inventor, because fine adjustments of color balance are often more necessary in the a* axis direction than in the b* axis direction, the distribution density of the moving target positions in the a* axis direction may be made higher than the distribution density of the moving target positions in the b* axis direction, as shown in FIG. 5A.

Figure 5A:
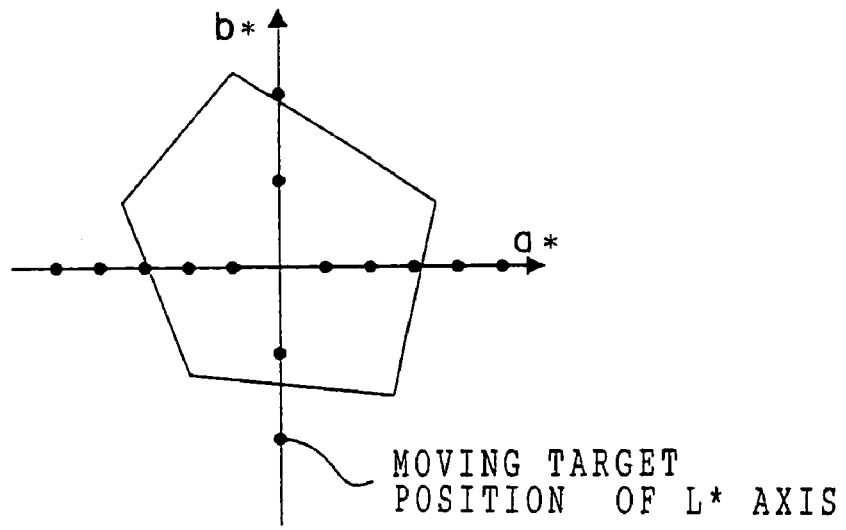
FIGS. 5A and 5B are line diagrams showing other examples of moving target positions.

(Setting of the moving target positions as shown in FIG. 5A corresponds to setting so that distribution density of the moving target positions in a direction substantially along an a* axis of a color space of an L*a*b* color system serving as the uniform color space becomes higher than distribution density of the moving target positions in directions other than the direction.)

Also, in the color balance correction of the image to be recorded on the recording paper 22 by the color printer 10, fine adjustments of the white balance of the image in the state where it is recorded on the recording paper 22 often become necessary. For this reason, as shown in FIG. 5B, the distribution density of the moving target positions in a predetermined region (the region enclosed by an oval in FIG. 5B) centered around a position on the L*a*b* color space of a color corresponding to the white of the recording paper 22 may be made higher than the distribution density of the moving target positions in other regions.

Figure 5B:
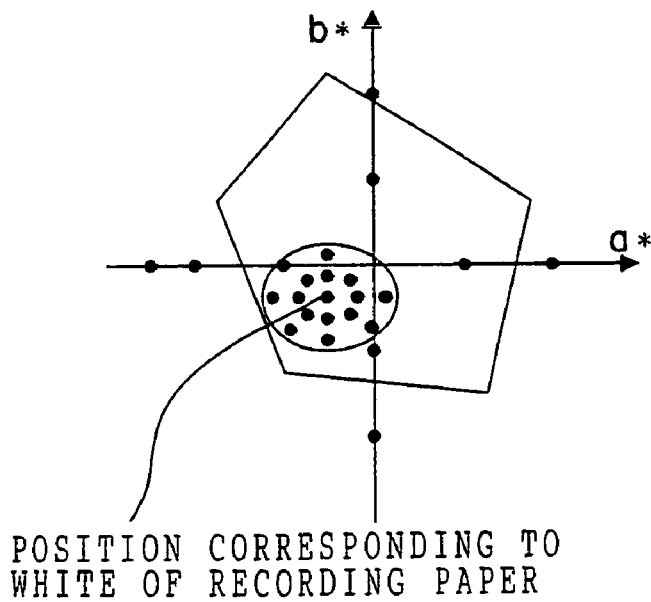

(Setting of the moving target positions as shown in FIG. 5B corresponds to setting so that distribution density of the moving target positions in a predetermined region including a position, on the uniform color space, of a color corresponding to white in a recording material that records the color image data to be processed as an image becomes higher than distribution density of the moving target positions in regions other than the region.)

It should be noted that, in a case where white balance adjustment of an image in a state where the image is being displayed on the display 32 is conducted, the "white of the display" may be used in place of the "white of the recording paper 22" in FIG. 5B.

(Setting of the moving target positions in this case corresponds to setting so that distribution density of the moving target positions in a predetermined region including a position, on the uniform color space, of a color corresponding to white in a display device that displays the color image data to be processed as an image becomes higher than distribution density of the moving target positions in regions other than the region.)

Incidentally, the conversion of R, G and B to C, M and Y (the first to the fourth conversions) by the printer driver 38 is conducted by the DLUT 40. When plural data (e.g., tone values of R, G and B of specific pixels of an image) are inputted to the DLUT 40, the DLUT 40 outputs other plural data corresponding to combination of the inputted plural data. However, when, for example, the number of inputted/outputted data is three and each datum is 8 bits, the combinations of the input data becomes $256^3=16777217$ ($256=2^8$), and assuming that data (conversion data) defining output data corresponding to the input data is prepared in regard to all combinations of the input data, an enormous storage capacity becomes necessary in order to store the conversion data.

In the present embodiment also, image data is inputted to the DLUT 40 where each pixel data (each R, G and B 8-bit data) is as unit and conversion (correction) is conducted where each pixel data is as unit; however, in the present embodiment, thinning-out of the conversion data may be conducted in order to reduce the data amount of the conversion data, only conversion data in a case where each of the R, G and B 8-bit data is a value corresponding to a divisional position where a numerical range (0 to 255) expressable by 8-bit data is divided by eight may be stored, and the output data may be determined from the stored conversion data by interpolation when conversion data corresponding to the R, G and B data inputted to the DLUT 40 are not present.

In the above description, the combination of the R, G and B data in which the corresponding conversion data is stored correspond to peak of individual rectangular region when, by dividing a color reproduction range expressable by each R, G and B 8-bit data distributed on an R, G and B color space defined by mutually perpendicular coordinate axes of R, G and B by positions corresponding to boundaries when 256 tones expressable by data of 8 bit are separated per 8 tones, the color reproduction range is divided into numerous cubes in a grid. Below, the combination of the R, G and B data in which the corresponding conversion data is stored will be called "grid point".

The color conversion parameter generation processing is processing that generates conversion parameter for color balance correction only with respect to the grid point. In step 102, the R, G and B data corresponding to each grid point position of the DLUT are respectively fetched from a table in which the data are preregistered. Also, in order to correspond the individual data, for which later-described correction has been conducted, with the data prior to correction, in step 104, a label for identifying the individual data is given to the R, G and B data corresponding to each grid point position incorporated in step 102, and these are temporarily stored in the memory of the data generation-use computer.

In step 106, the R, G and B data corresponding to each grid point position are respectively converted to data of the L*a*b* color system, and the data of the L*a*b* color system corresponding to each grid point position obtained by the conversion are temporarily stored in the memory of the data generation-use computer. The conversion in step 106 can be realized, for example, by converting the R, G and B data to data of an sRGB color system in accordance with a predetermined arithmetic expression, converting the data of the sRGB color system to data of an XYZ color system (tristimulus values X, Y, Z) in accordance with a predetermined arithmetic expression, and then converting the data of the XYZ color system to data of the L*a*b* color system (lightness L and color coordinates a, b) in accordance with a predetermined arithmetic expression.

In step 108, unprocessed (conversion parameter being unset) specific moving target position is fetched from the moving target positions plurally set in step 100. Also, in step 110, color balance correction corresponding to the L* axis being moved to the specific moving target position fetched in step 108 is conducted with respect to each data of the L*a*b* color system corresponding to each grid point position temporarily stored in step 106. This color balance correction is effected by determining the distance (moving distance) between the L* axis and the moving target position and the direction (moving direction) towards the moving target position from the L* axis, and respectively determining new coordinate positions on the L*a*b* color space when the present coordinate positions on the L*a*b* color space are moved by the above moving distance in the above moving direction with respect to each data of the L*a*b* color system corresponding to respective the grid point positions. Then, in step 112, the data of the L*a*b* color system that have passed through the color balance correction are converted to C, M and Y data (called correction data). It should be noted that the conversion condition of the third conversion can be applied to this conversion.

In step 114, the R, G and B data corresponding to the specific grid point positions of the DLUT 40 are fetched from the R, G and B data temporarily stored in the memory in step 104. In step 116, the correction data (correction data to which labels that are identical to those of the data fetched in step 114 have been given) corresponding to the R, G and B data fetched in step 114 are fetched from among the C, M and Y correction data that have passed through the color balance correction, conversion data (conversion data for outputting the corresponding C, M and Y correction data from the DLUT 40 when the R, G and B data corresponding to the specific grid point positions are inputted to the DLUT 40) are generated in which the R, G and B data corresponding to the specific grid point positions are associated with the corresponding C, M and Y correction data, and the processing proceeds to step 118.

In step 118, it is determined whether or not conversion data have been generated with respect to all of the grid point positions of the DLUT 40 (all of the R, G and B data temporarily stored in the memory in step 102). If the determination is negative, the processing returns to step 114, and steps 114 to 118 are repeated until the determination in step 118 is affirmative. When the generation of conversion data is completed with respect to all of the grid point positions of the DLUT 40, the determination in step 118 is affirmative, the processing proceeds to step 120, and the conversion data generated by this processing are stored as color conversion parameters in the memory.

Figure 4C:
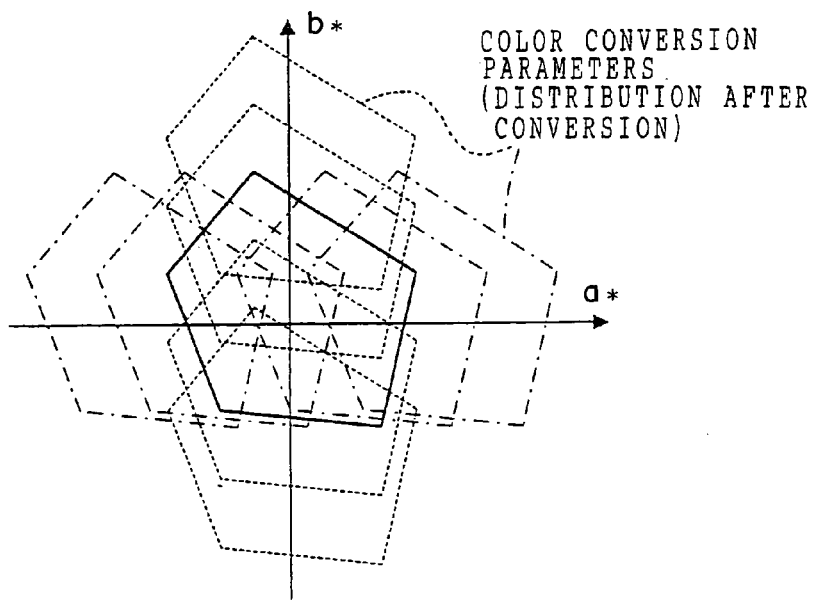
FIG. 4C is a line diagram showing an example of color conversion parameters set on the basis of the moving target positions of FIG. 4(B)

In step 122, it is determined whether or not color conversion parameters have been generated with respect to all of the moving target positions set in step 100. If the determination is negative, the processing returns to step 108, and steps 108 to 122 are repeated until the determination in step 122 is affirmative. Thus, as shown in the example of FIG. 4C, plural color conversion parameters corresponding to the set plural moving target positions are generated.

The plural color conversion parameters generated by the above color conversion parameter generation processing are color conversion parameters where R, G and B image data are converted to C, M and Y image data, and are generated in consideration also of the conversion condition of the third conversion. Thus, by converting the R, G and B image data using this parameter, the first conversion and the third conversion are also effected simultaneously in addition to the fourth conversion.

In the present embodiment, the plural color conversion parameters generated by the color conversion parameter generation processing are respectively synthesized with conversion parameters for realizing the second conversion that coincides the lightness range of the image data with the lightness range of the color reproduction region of the color printer 10 (thus, color conversion parameters for causing the first to fourth conversions to be conducted simultaneously in the DLUT 40 are obtained), and the synthesized plural color conversion parameters are made to belong to the printer driver 38. Thus, the plural color conversion parameters belonging to the printer driver 38 are stored in the HDD 36 of the PC 30 when the printer driver 38 is installed in the PC 30 (also see FIG. 2). In this manner, the HDD 36 corresponds to a storage unit of the invention.

Figure 6:
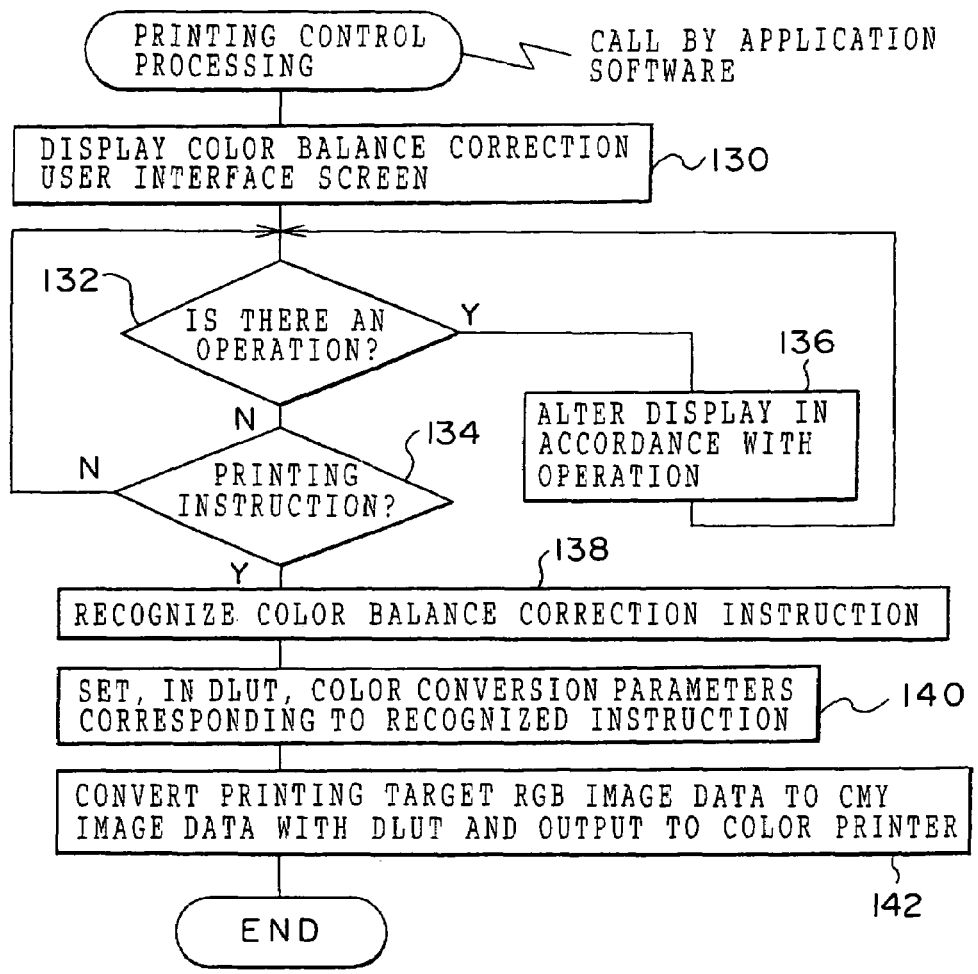
FIG. 6 is a flow chart showing the content of printing control processing.

Next, processing conducted by the PC 30 and the color printer 10 when an image is recorded on the recording paper 22 will be described. When the user instructs printing to the application software in a state where the application software is operating in the PC 30, the printer driver 38 is accessed from the application software and the program of the printer driver 38 is executed by the PC 30, whereby the printing control processing shown in FIG. 6 is conducted.

It should be noted that this printing control processing corresponds to the correction unit of the invention. Also, the conversion of image data that the printer driver 38 conducts using the DLUT 40 corresponds to the first conversion unit, the conversion of image data by the UCR processing unit 42 and the TRC processing unit 44 of the printer controller 28 corresponds to the second conversion unit, and the printing control processing described below specifically corresponds to the correction unit that conducts color balance correction with respect to processing target image data by setting, in the multidimensional look-up table that the first conversion unit uses in conversion, the conversion parameters generated on the basis of the color correction parameters read from the storage unit.

In the printing control processing, first, a user interface screen for the user to instruct color balance correction is displayed on the display 32 in step 130. For the user interface screen, as shown in FIG. 7A, a screen can be used where the respective colors of red, green, yellow and blue are displayed as emphasis targets and where arrow-shaped icons 50 (these may also have other shapes) for designating emphasis scale are disposed for each color. With this screen, the user can instruct emphasis of specific color by operating the mouse 35 and clicking on the icon 50 corresponding to the specific emphasis target color, and the user can also instruct the emphasis scale of the specific color with the number of clicks on the icon 50. It should be noted that the processing that displays the user interface screen shown in FIG. 7A corresponds to an instruction unit described later (specifically, an instruction unit configured to be able to instruct color balance correction by designating the strength/weakness of the emphasis target hue) pertaining to the invention together with the mouse 35 for instructing the color balance correction.

It should be noted that, instead of the emphasis target hues in the user interface screen, the invention may also be configured to display attenuation target hues as shown in FIG. 7B. Because there are many cases where an instruction for color balance correction is given when the user perceives that a specific color is being emphasized more than necessary, such as red being too strong, the user can more easily instruct color balance correction using the user interface screen shown in FIG. 7B. It should be noted that the processing that displays the user interface screen shown in FIG. 7B corresponds to an instruction unit (specifically, an instruction unit configured to be able to instruct color balance correction by designating the strength/weakness of the attenuation target hue) pertaining to the invention together with the mouse 35 for instructing color balance correction.

Also, in the color balance correction with respect to images where humans are shot, fine adjustment of skin color is important, and in the color balance correction with respect to such images, a user interface screen where fine adjustment of skin color is clearly displayed, as shown in FIG. 7C, may also be used.

In step 132, it is determined whether or not an operation giving some kind of instruction in regard to color balance correction has been conducted by the user confirming the user interface screen displayed on the display 32. If the determination is negative, the processing proceeds to step 134, where it is determined whether or not printing of the printing target image has been instructed. If this determination is also negative, the processing returns to step 132, and steps 132 and 134 are repeated until the determination of either step 132 or step 134 is affirmative.

In a case where it is perceived that fine differences in color (gray balance, etc.) have arisen in the image to be recorded on the recording paper 22 by the color printer 10 due to differences in the machines and variations in environmental conditions, the user (or an operator in charge of maintenance that the manufacturer of the color printer 10 has sent) inputs an instruction in regard to color balance correction by conducting an operation such as clicking on the icons 50 via the mouse 35, so that difference such as gray balance is eliminated.

When the aforementioned operation is conducted, the determination in step 132 is affirmative, the processing proceeds to step 136, the display of the display 32 is changed in accordance with the operation of the user, and the processing returns to step 132. It should be noted that, although processing such as displaying characters designating the color for which emphasis has been instructed and the emphasis scale of the color is given as an example of the processing of step 136, the invention may also be configured so that, in a case where the color conversion parameter corresponding to the fourth conversion is used as the parameter for outputting as the R, G and B image data by conducting only color balance correction with respect to inputted R, G and B image data, processing where the printing target image data is converted using the color correction parameter corresponding to the instruction in regard to the color balance correction inputted by the user, and the converted image is displayed on the display 32 as a preview image, may be conducted.

When printing of a printing target image is instructed by the user who has finished inputting of the instruction in regard to color balance correction, the determination in step 134 is affirmative and the processing proceeds to step 138, where the instruction in regard to the color balance correction (color for which emphasis has been instructed and the emphasis scale of the color) that is finally recognized due to printing being instructed by the user is confirmed. In step 140, on the basis of the result of the confirmation in step 138, the color conversion parameter corresponding to the instruction from the user in regard to color balance correction is read from the plural color conversion parameters stored in the HDD 36, and these color conversion parameter is set in the DLUT 40.

Then, in step 142, the printing target R, G and B image data are fetched in order where each pixel data is as unit, and the fetched pixel data is inputted, in order, to the DLUT 40 in which the color conversion parameter has been set, whereby the printing target R, G and B image data are converted to C, M and Y image data. This processing is specifically effected by first determining whether or not the conversion data that corresponds the fetched pixel data (R, G and B data) to output data is registered in the DLUT 40 (i.e., whether it is data corresponding to the grid point position), and if registered in the DLUT 40, outputting the output data (C, M and Y data) corresponded to the pixel data and registered in the conversion table, and if not registered in the DLUT 40, determining by interpolation the output data corresponding to the pixel data on the basis of the plural output data corresponded to the data of the plural grid point positions positioned at the periphery of the coordinate position of the image data on the RGB color space and registered in the DLUT 40.

Due to this conversion, the first to fourth conversions are simultaneously conducted with respect to the printing target R, G and B image data. In step 142, the C, M and Y image data obtained by the conversion are successively outputted to the printer controller 28 of the color printer 10 and the printing control processing ends.

UCR processing is conducted by the UCR processing unit 42, whereby the C, M and Y image data successively inputted from the PC 30 (the printer driver 38) to the printer controller 28 by the printing control processing are successively converted to C, M, Y and K image data, and then TRC processing is conducted by the TRC processing unit 44, whereby tone characteristics are corrected in accordance with the characteristics of the toners of the color printer 10. Then, SCREEN processing is conducted by the SCREEN processing unit 46, whereby C, M, Y and K page images are generated per single page.

The C, M, Y and K page images are outputted one color at a time to the light beam scanning device 16 when the electrostatic latent images are formed on the photosensitive drum 12, the electrostatic latent images corresponding to specific colors are formed on the photosensitive drum 12, the development of the formed electrostatic latent image with the toner of the specific color by the multicolor developing unit 18 is repeated four times, whereby full-color toner image is formed on the photosensitive drum 12, the toner image is transferred to the recording paper 22 via the transfer belt 20, and the toner image transferred to the recording paper 22 is fixed by the fixing unit 26, whereby the recording paper 22 on which the printing target image has been recorded is discharged to the outside of the color printer 10.

The user references the image recorded on the discharged recording paper 22 and evaluates whether or not fine differences such as gray balance have been eliminated. Then, if the differences have not been eliminated, the user instructs printing again and inputs an instruction in regard to color balance correction, whereby fine adjustments of color balance are conducted. By repeating this process as needed, an image where fine differences such as gray balance that arise due to differences in the machines and variations in environmental conditions are eliminated can be obtained.

In this manner, in the present invention, because it is not necessary to use a test chart when conducting correction of differences in color balance resulting from differences in the machines and variations in environmental conditions, costs do not increase because a calorimeter being disposed in the color printer 10 and/or preparing a separate scanner is not necessary, and an enormous burden as a result of causing the user to conduct the operation of comparing individual patches on a test chart with samples is not placed on the user.

Also, because the color conversion parameters are determined beforehand and stored in the HDD 36 and the color conversion parameter is read and used for color balance correction, color balance correction can be realized by simple processing. Also, because the moving target positions when determining the color conversion parameters are set so that the distribution density of the moving target positions in the direction or region where color balance correction on the L*a*b* color space is necessary becomes higher, color balance can be precisely adjusted in comparison to the number of color conversion parameters.

Also, in the present embodiment, because the conversion (including the color balance correction (fourth conversion) pertaining to the invention) from the R, G and B image data to the C, M and Y image data is conducted by the PC 30 and the conversion from the C, M and Y image data to the C, M, Y and K image data is conducted by the color printer 10, the load applied by conducting a series of conversions can be dispersed to the PC 30 and the color printer 10.

However, the present invention is not limited to a configuration where the processing is dispersed as described above, and may also be configured so that processing of the series of conversions from the R, G and B image data to the C, M, Y and K image data is all conducted by the PC 30 or the color printer 10. In a case where the color balance correction pertaining to the invention is conducted by the color printer 10, the color conversion parameters may be stored in the ROM disposed in the printer controller of the color printer 10, but it is preferable for the color conversion parameters to be stored in the HDD disposed in the color printer 10 because it is necessary to significantly increase the capacity of the ROM if stored in the ROM.

It should be noted that, although an example has been described above where the printer driver 38 had a configuration that realized the first to fourth conversions by a one-time conversion by the DLUT 40, the invention is not limited thereto the same. The each of first to fourth conversions may be individually conducted by different LUT, or the conversions may be realized by storing the individual conversions as arithmetic expressions and substituting variable in the arithmetic expressions.

Also, although a case has been described above where the moving target positions are set with respect to the L* axis that is the lightness axis in the L*a*b* color space, the moving target positions may also be set with respect to the gray axis representing the gray balance of the image data.

Also, although the color printer 10 that forms an image with an electrophotographic manner has been described as an example, the invention is not limited to the same and can also be applied to a printer that forms an image with an inkjet manner.

In the first aspect of the invention, it is preferable that the moving target positions are plurally set so that distribution density of the moving target positions in a direction or a region where fine adjustment of color balance is necessary in the uniform color space becomes higher than distribution density of the moving target positions in directions or regions other than the direction or the region. An example of a direction where fine adjustment of color balance is necessary in the uniform color space is the direction substantially along the a* axis of the color space of the L*a*b* color system. Also, examples of regions where fine adjustment of color balance in the uniform color space is necessary are: a predetermined region including a position, on the uniform color space, of a color corresponding to white in a display device that displays the color image data to be processed as an image; a predetermined region including a position, on the uniform color space, of a color corresponding to white in a recording material that records thereon the color image data to be processed as an image; and a predetermined region including a position corresponding to skin color on the uniform color space. By setting the moving target positions corresponding to the individual color correction parameters so that the distribution density of the moving target positions in a direction or a region where fine adjustment of color balance is necessary becomes higher than that in other directions or regions, color balance can be more precisely adjusted than the number of color correction parameters.

Incidentally, the inventor experimentally obtained the knowledge that there are many cases where fine adjustment of color balance by color balance correction becomes more necessary in the a* axis direction (red-green direction) than in the b* axis direction (blue-yellow direction) in the color space of the L*a*b* color system. On the basis of this, it is preferable for the moving target positions of the first aspect of the invention to be set so that the distribution density of the moving target positions in the direction substantially along the a* axis in the color space of the L*a*b* color system serving as the uniform color space becomes higher than that in other directions. Thus, because parameters with which the color balance in the direction substantially along the a* axis can be finely adjusted can be obtained as the plural color correction parameters, color balance correction can be more precisely conducted than the number of color correction parameters.

There are also many cases where fine adjustment becomes necessary with respect to white balance when an image is displayed on the display device. On the basis of this, it is preferable that the moving target positions are set so that distribution density of the moving target positions in a predetermined region including a position, on the uniform color space, of a color corresponding to white in a display device that displays the color image data to be processed as an image becomes higher than distribution density of the moving target positions in regions other than the region. Thus, because parameters with which the white balance of the image displayed on the display device can be finely adjusted can be obtained as the plural color correction parameters, the white balance of the image displayed on the display device can be more precisely corrected than the number of color correction parameters.

Moreover, there are also many cases where fine adjustment becomes necessary with respect to white balance when an image is recorded on the recording material. On the basis of this, it is preferable that the moving target positions are set so that distribution density of the moving target positions in a predetermined region including a position, on the uniform color space, of a color corresponding to white in a recording material that records thereon the color image data to be processed as an image becomes higher than distribution density of the moving target positions in regions other than the region. Thus, because parameters with which the white balance of the image to be recorded on the recording material can be finely adjusted can be obtained as the plural color correction parameters, the white balance of the image to be recorded on the recording material can be more precisely corrected than the number of color correction parameters.

Also, in the first aspect, in a case where the image processing device is configured to include a first conversion unit that uses a multidimensional look-up table to convert the inputted color image data to be processed to C, M and Y image data, to thereby simultaneously perform correction corresponding to characteristics of a recording unit that records the image data as an image on a recording material, and a second conversion unit that uses a look-up table to perform conversion to C, M, Y and K image data and perform tone correction with respect to the C, M and Y image data subject to the conversion by the first conversion unit, the correction unit can be configured to perform color balance correction with respect to the color image data to be processed by setting, in the multidimensional look-up table that the first conversion unit uses in conversion, a conversion parameter (a conversion parameter for conducting conversion where color balance correction resulting from the color correction parameter and other correction or conversion (e.g., conversion from R, G and B to L*a*b*, conversion from L*a*b* to C, M and Y, correction that matches the lightness range to the characteristics of a recording unit) are integrated) generated on the basis of the color correction parameter read from the storage unit.

Also, the instruction unit of the first aspect can be configured to be able to instruct color balance correction by designating the strength/weakness of the emphasis target hue. Thus, the user can easily instruct color balance correction via the instruction unit. Also, in consideration of the fact that there are many times when color balance correction is conducted in a case where it is perceived that the color balance of the image is deflected on a specific color (that a specific color is being emphasized more than necessary), the instruction unit may be configured to be able to instruct color balance correction by designating the strength/weakness of an attenuation target hue. Thus, the user can more easily instruct color balance correction via the instruction unit.

Also, in the second aspect, in a case where the moving target positions are plurally set so that distribution density of the moving target positions in a direction or a region where fine adjustment of color balance is necessary in the uniform color space becomes higher than distribution density of the moving target positions in directions or regions other than the direction or the region, the color balance can be more precisely adjusted than the number of color correction parameters.

Further, in the second aspect, in a case where a first conversion in which, using a multidimensional look-up table, the inputted color image data to be processed is converted to C, M and Y image data, to thereby simultaneously perform correction corresponding to recording characteristics at a time of recording of the image data as an image on a recording material and a second conversion in which, using a look-up table, the C, M and Y image data subject to the first conversion is converted to C, M, Y and K image data and is performed tone correction, are processed, the color balance correction with respect to the color image data to be processed is performed with setting, in the multidimensional look-up table in processing the first conversion, a conversion parameter generated on the basis of the read color correction parameter.

As described above, in the present invention, in a case where the moving target positions of the lightness axis or the gray axis on the uniform color space are plurally set, and, with respect to the plural moving target positions, color balance parameters, where color balance correction corresponding to the lightness axis or the gray axis being moved substantially parallel towards specific moving target position on the uniform color space is effected with respect to the color image data, are stored, and when color balance correction with respect to the color image data to be processed is instructed, the color correction parameter corresponding to the instructed color balance correction is read and color balance correction is conducted using the read color correction parameter. Thus, the invention has the excellent effect that it becomes possible to conduct color balance correction easily and with high precision without placing a burden on the user or increasing costs.

What is claimed is:

1. An image processing device comprising:
   a storage unit that stores in advance a plurality of color correction parameters for performing color balance correction,
      the color correction parameters corresponding to a plurality of set moving target positions of a lightness axis or a gray axis on an uniform color space, and
      the color balance correction corresponding to only moving the lightness axis or the gray axis parallel to a specific moving target position selected from among a plurality of set moving target positions on the uniform color space with respect to inputted color image data; and
   a correction unit that reads a color correction parameter and performs color balance correction,
      the color correction parameter being read from among the plurality of the color correction parameters stored in the storage unit,
      the correction unit reading the color correction parameter when instructed to do so by an instruction unit, and
      the color balance correction being performed with respect to the color image data to be processed using the read color correction parameter.

2. The image processing device of claim 1, wherein the plurality of color correction parameters are stored so that distribution density of the set moving target positions in a first direction or a first region where fine adjustment of the color balance is necessary in the uniform color space becomes higher than that in directions or regions other than the first direction or the first region.

3. The image processing device of claim 1, wherein the first direction is a direction substantially along an a* axis in a color space of an L*a*b* color system serving as the uniform color space.

4. The image processing device of claim 2, wherein the first region includes a position, on the uniform color space, of a color corresponding to white in a display device that displays the color image data to be processed as an image.

5. The image processing device of claim 2, wherein the first region includes a position, on the uniform color space, of a color corresponding to white in a recording material that records thereon the color image data to be processed as an image.

6. The image processing device of claim 1, further comprising
   a first conversion unit that uses a multidimensional look-up table to convert the inputted color image data to be processed to C, M and Y image data, to thereby simultaneously perform correction corresponding to characteristics of a recording unit that records the image data as an image on a recording material, and
   a second conversion unit that uses a look-up table to perform conversion to C, M, Y and K image data and perform tone correction with respect to the C, M and Y image data subject to the conversion by the first conversion unit,
   wherein the correction unit performs color balance correction with respect to the color image data to be processed by setting, in the multidimensional look-up table that the first conversion unit uses in conversion, a conversion parameter generated on the basis of the color correction parameter read from the storage unit.

7. The image processing unit of claim 1, wherein the instruction unit is configured to be able to instruct color balance correction by designating strength/weakness of hue to be emphasized.

8. The image processing unit of claim 1, wherein the instruction unit is configured to be able to instruct color balance correction by designating strength/weakness of hue to be attenuated.

9. An image processing method comprising:
   setting a plurality of moving target positions of a lightness axis or a gray axis on a uniform color space;
   storing in a storage unit a plurality of color correction parameters for performing color balance correction, the color correction parameters corresponding to the plurality of set moving target positions, and the color balance correction being performed by only moving the lightness axis or the gray axis parallel to a specific moving target position selected from among the plurality of set moving target positions on the uniform color space with respect to inputted color image data;

reading a color correction parameter from among the plurality of the color correction parameters stored in the storage unit when instructed to do so by an instruction unit; and performing the color balance correction with respect to color image data to be processed using the read color correction parameter.

10. The image processing device of claim 1, wherein the plurality of color correction parameters are stored so that distribution density of the set moving target positions in a first direction or a first region where fine adjustment of the color balance is necessary in the uniform color space becomes higher than that in directions or regions other than the first direction or the first region.

11. The image processing method of claim 9, wherein the first direction is a direction substantially along an a* axis in a color space of an L*a*b* color system serving as the uniform color space.

12. The image processing method of claim 10, wherein the first region includes a position, on the uniform color space, of a color corresponding to white in a display device that displays the color image data to be processed as an image.

13. The image processing method of claim 10, wherein the first region includes a position, on the uniform color space, of a color corresponding to white in a recording material that records thereon the color image data to be processed as an image.

14. The image processing method of claim 9, further comprising processing a first conversion in which, using a multidimensional look-up table, the inputted color image data to be processed is converted to C, M and Y image data, to thereby simultaneously perform correction corresponding to recording characteristics at a time of recording of the image data as an image on a recording material, and processing a second conversion in which, using a look-up table, the C, M and Y image data subject to the first conversion is converted to C, M, Y and K image data and is performed tone correction, wherein the color balance correction with respect to the color image data to be processed is performed with setting, in the multidimensional look-up table in processing the first conversion, a conversion parameter generated on the basis of the read color correction parameter.

15. The image processing method of claim 9, wherein the color balance correction can be instructed by designating strength/weakness of hue to be emphasized.

16. The image processing method of claim 9, wherein the color balance correction can be instructed by designating strength/weakness of hue to be attenuated.

17. The image processing device of claim 2, wherein the first region includes a position, on the uniform color space, of a predetermined color in a display device that displays the color image data to be processed as an image.

18. The image processing device of claim 2, wherein the first region includes a position, on the uniform color space, of a predetermined color in a recording material that records thereon the color image data to be processed as an image.

19. The image processing device of claim 2, wherein the first region includes a position, on the uniform color space, of a predetermined color.

* * * * *